United States Patent
Yamada et al.

(10) Patent No.: US 6,793,982 B1
(45) Date of Patent: Sep. 21, 2004

(54) ELECTRODE OF GREEN COMPACT FOR DISCHARGE SURFACE TREATMENT, METHOD OF PRODUCING THE SAME, METHOD OF DISCARGE SURFACE TREATMENT, APPARATUS THEREFOR, AND METHOD OF RECYCLING ELECTRODE OF GREEN COMPACT FOR DISCHARGE SURFACE TREATMENT

(75) Inventors: Hisashi Yamada, Tokyo (JP); Akihiro Goto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/462,631
(22) PCT Filed: Oct. 19, 1998
(86) PCT No.: PCT/JP98/04707
§ 371 (c)(1),
(2), (4) Date: Jan. 11, 2000
(87) PCT Pub. No.: WO99/58282
PCT Pub. Date: Nov. 18, 1999

(30) Foreign Application Priority Data

May 13, 1998 (JP) .......................... 10/130316

(51) Int. Cl.⁷ .................. C25B 11/02; C25B 11/04; C25B 11/12; B23H 7/24; H05H 1/48
(52) U.S. Cl. .................... 427/580; 427/140; 219/69.15; 219/69.17; 29/868; 204/192.38; 204/298.41
(58) Field of Search ............................ 427/580, 540, 427/140, 142; 219/69.1, 69.11, 69.15, 69.17; 29/825, 868, DIG. 8, DIG. 49; 148/224; 204/192.38, 298.41; 118/723 E; 264/125

(56) References Cited

U.S. PATENT DOCUMENTS

| | | | | |
|---|---|---|---|---|
| 3,619,286 A | * | 11/1971 | Gutnajar | |
| 3,932,100 A | * | 1/1976 | Blindheim | ................... 425/412 |
| 4,396,482 A | | 8/1983 | Das et al. | |
| 4,440,835 A | * | 4/1984 | Vignaud | ..................... 427/115 |
| 4,754,115 A | * | 6/1988 | Rhoades | ................... 219/69 E |
| 5,698,114 A | * | 12/1997 | Magara et al. | ............... 427/580 |
| 5,858,479 A | * | 1/1999 | Saito et al. | ................. 427/580 |
| 6,033,722 A | * | 3/2000 | Koike et al. | ................. 427/122 |
| 6,086,684 A | * | 7/2000 | Saito et al. | ................. 472/580 |
| 6,365,008 B1 | * | 4/2002 | Goto et al. | ................. 204/164 |
| 6,437,278 B1 | * | 8/2002 | Inoue et al. | ............. 219/69.15 |
| 6,441,333 B1 | * | 8/2002 | Goto et al. | .............. 219/69.15 |

FOREIGN PATENT DOCUMENTS

| | | | |
|---|---|---|---|
| DE | 197 01 170 A1 | 7/1997 | |
| GB | 828 336 | 2/1960 | |
| JP | 54-105396 | 8/1979 | ............. B23P/1/00 |

(List continued on next page.)

OTHER PUBLICATIONS

Derwent abstracts JP 710240501B—No Author Given, Acc. No. 1971–46375S, 1999 no month .*

*Primary Examiner*—Marianne Padgett
(74) *Attorney, Agent, or Firm*—Sughrue Mion, PLLC

(57) ABSTRACT

A green-compact electrode (1) for discharge surface treatment for use in a discharge surface treatment operation for forming a hard coating film (9) on the surface of an object (2) which must be machined by performing a discharging operation in working fluid (4) is structured such that powder (11) made of metal, such as W or Ti, and fluid (12) which is the same as working fluid are mixed with each other, and the mixed substance is compression-molded so that the green-compact electrode (1) for the discharge surface treatment is obtained.

9 Claims, 4 Drawing Sheets

FOREIGN PATENT DOCUMENTS

| JP | 61-109613 | 5/1988 | ........... B23H/1/06 |
| JP | 05117720 | * 5/1993 | |
| JP | 406306511 A | * 11/1994 | |
| JP | 407-070761 | * 3/1995 | |
| JP | 7-90688 | 4/1995 | ........... C25D/11/04 |
| JP | 7-197275 | 8/1995 | ........... C23C/26/00 |
| JP | 9-192937 | 7/1997 | ........... B23H/9/00 |
| JP | 4 11-000827 A | * 1/1999 | |
| JP | 410284051 A | * 10/1999 | |
| WO | WO 00/29159 | * 5/2000 | |

* cited by examiner

HIGH PRESSURE

EASILY BROKEN WHEN ELECTRODE IS TAKEN OUT

ELECTRODE OF GREEN COMPACT FOR DISCHARGE SURFACE TREATMENT, METHOD OF PRODUCING THE SAME, METHOD OF DISCARGE SURFACE TREATMENT, APPARATUS THEREFOR, AND METHOD OF RECYCLING ELECTRODE OF GREEN COMPACT FOR DISCHARGE SURFACE TREATMENT

TECHNICAL FIELD

The present invention relates to improvements in a green-compact electrode for discharge surface treatment with which a discharging operation is performed in working fluid to form a hard coating film on the surface of an object which must be processed, a manufacturing method therefor, a method and an apparatus for performing discharge surface treatment and a method of recycling green-compact electrode for discharge surface treatment.

BACKGROUND OF THE INVENTION

A conventional technique for performing discharge surface treatment has been disclosed in Japanese Patent Laid-Open No. 9-192937. According to the foregoing disclosure, a material for producing a hard carbide, such as Ti, is employed to serve as an electrode. Then, discharge is caused to occur with a metal material, which is a material to be machined, so that a strong hard coating film is formed on the surface of the metal which is a material to be machined.

FIG. 5 shows a method of molding a green-compact electrode obtained by compression-molding metal powder or the like and arranged to serve as the electrode for use in the discharge surface treatment process. Referring to FIG. 5, reference numeral 51 represents a punch, 52 represents a die and 53 represents a green-compact electrode in the form of powder. The powder green-compact electrode is compression-molded by using a mold.

When the green-compact electrode shown in FIG. 5 is molded, great pressure is generated on the side surfaces of the die 52. Therefore, mold release characteristics required after the molding process are unsatisfactory. Thus, there arises a problem in that the green-compact electrode obtained by compression molding is easily broken. Another problem arises in that the green-compact electrode is too brittle. Therefore, the manufacturing yield of the green-compact electrode excessively deteriorates.

When the brittle green-compact electrode is employed in a discharge surface treatment, the hard coating film formed on the object, which has been subjected to the discharge surface treatment, cannot be uniform.

To overcome the above-mentioned problems, a mold release agent or a hardener is required. When oleic acid or the like is employed which is usually employed as a mold release agent for a sintered body, the mold release agent disperses and melts in the working fluid. Therefore, components in the working fluid are changed. Therefore, a coating film having a required quality and hardness cannot be formed on the surface of the object which must be machined. Also, the use of usual hardeners causes similar problems.

DISCLOSURE OF THE INVENTION

To overcome the above-mentioned problems, a first object of the present invention is to improve the brittleness of a green-compact electrode for discharge surface treatment so as to form a stable and uniform hard coating film on an object which must be machined by performing discharge surface treatment using the green-compact electrode for the discharge surface treatment.

A second object of the present invention is to improve the mold release characteristics and hardenability of a green-compact electrode for discharge surface treatment required to perform compression molding so as to efficiently manufacture the green-compact electrode for discharge surface treatment.

A third object of the present invention is to obtain a method and apparatus for performing discharge surface treatment which do not exert an influence on the formation of a hard coating film on an object, which must be machined, even if the discharge surface treatment is repeated and enabling the characteristics for forming a uniform coating film of the material of the electrode to be exhibited.

A fourth object of the present invention is to obtain a method of recycling a green-compact electrode for discharge surface treatment.

A green-compact electrode for discharge surface treatment disclosed in a first aspect of the present invention is obtained by mixing a material of the green-compact electrode for discharge surface treatment and fluid which is the same as the working fluid.

A green-compact electrode for discharge surface treatment disclosed in a second aspect of the present invention has a structure that a mixture ratio of the fluid which is the same as the working fluid with respect to the green-compact electrode for discharge surface treatment is 5 wt % to 10 wt %.

A method of manufacturing a green-compact electrode for discharge surface treatment disclosed in a third aspect of the present invention comprises the step of: compression-molding a mixed material of a material of a green-compact electrode for discharge surface treatment and fluid which is the same as working fluid to manufacture a green-compact electrode for discharge surface treatment.

A method of manufacturing a green-compact electrode for discharge surface treatment disclosed in a fourth aspect of the present invention comprises the step of: compression-molding a mixed material having a structure that a mixture ratio of the fluid which is the same as the working fluid with respect to the green-compact electrode for discharge surface treatment is 5 wt % to 10 wt % to manufacture a green-compact electrode for discharge surface treatment.

A method of performing discharge surface treatment disclosed in a fifth aspect of the present invention comprises the step of: using a mixed material of a material of the green-compact electrode for discharge surface treatment and fluid which is the same as the working fluid as an electrode.

An apparatus for performing discharge surface treatment disclosed in a sixth aspect of the present invention comprises: a material of the green-compact electrode for discharge surface treatment and fluid which is the same as the working fluid which constitute the green-compact electrode for discharge surface treatment.

A method of recycling a green-compact electrode for discharge surface treatment disclosed in a seventh aspect of the present invention comprises: a compression molding step for molding mixed material of a material of the green-compact electrode for discharge surface treatment and fluid which is the same as the working fluid; a discharge surface treatment step for performing a discharge surface treatment process by using an electrode obtained by compression molding; and a pulverizing step for forming portions in which the electrodes are left after the discharge surface treatment step has been completed into powder, wherein the compression molding step and following steps are repeated after the pulverizing step has been completed.

BEST MODE FOR CARRYING OUT THE INVENTION

First Embodiment

Figure 1:
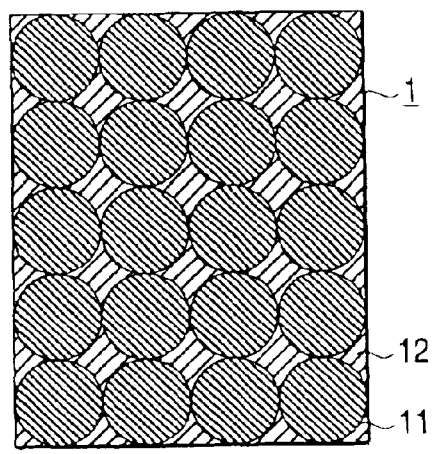
FIG. 1 is a diagram showing a structure of a molded green-compact electrode for discharge surface treatment according to a first embodiment of the present invention.
Figure 2:
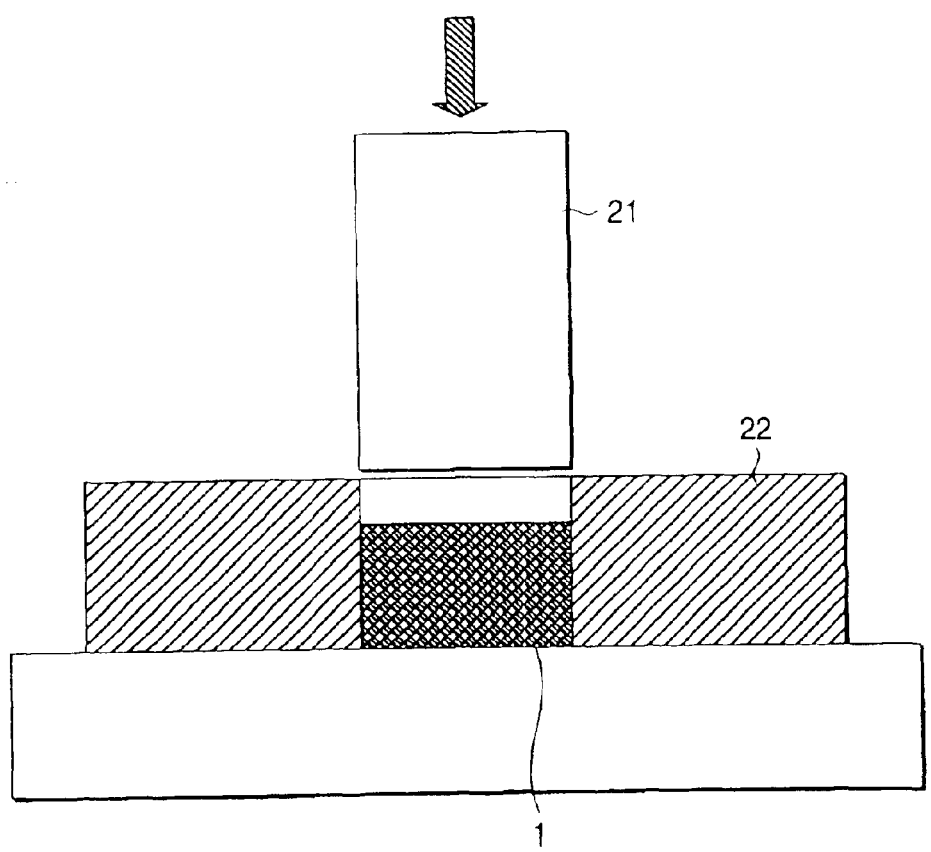
FIG. 2 is a cross sectional view showing a mold for use to perform compression molding of a green-compact electrode for discharge surface treatment according to the present invention.

FIG. 1 is a diagram showing the structure of a molded green-compact electrode for discharge surface treatment according to a first embodiment of the present invention. Referring to FIG. 1, reference numeral 11 represents powder of metal, such as W or Ti. Reference numeral 12 represents fluid which is the same as working fluid and which has been solidified by compression molding so that a green-compact electrode 1 has been molded. FIG. 2 is a cross sectional view showing a mold for use in a process for compression-molding the green-compact electrode 1. Reference numeral 21 represents a punch and 22 represents a die.

Figure 3:
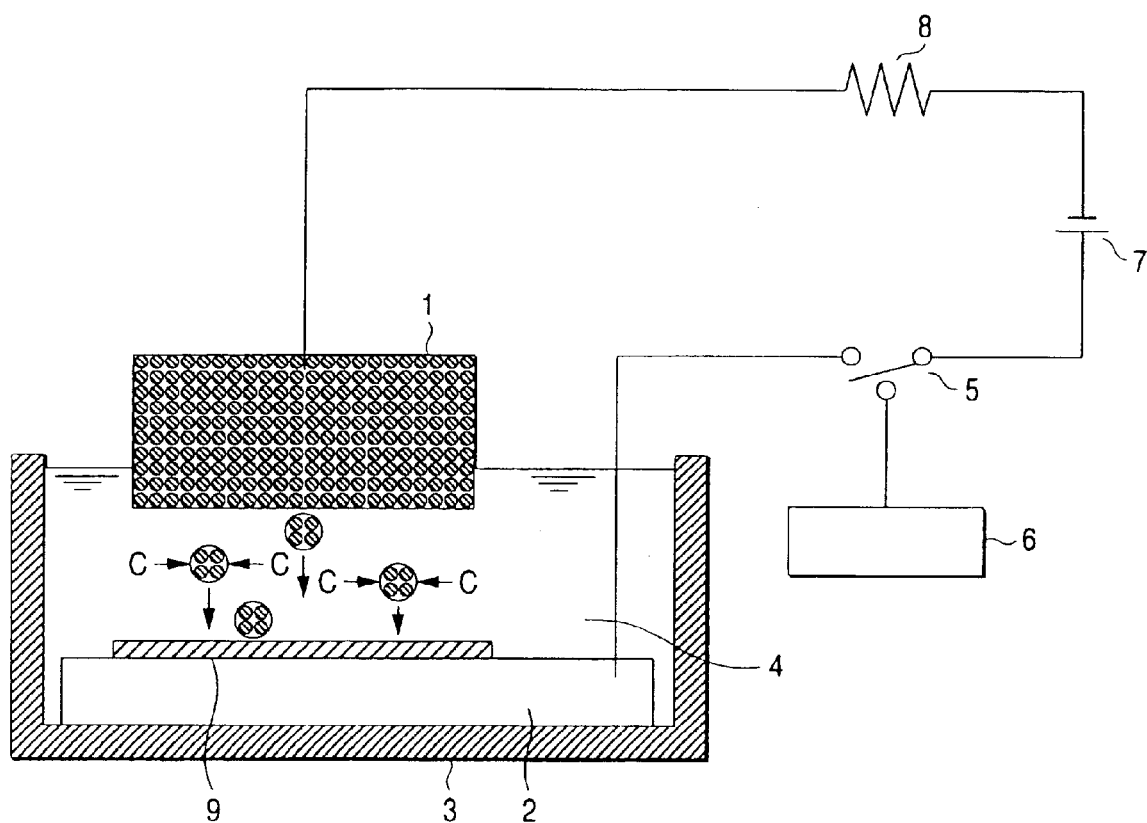
FIG. 3 is a structural view showing a concept of a discharge surface treatment apparatus.

FIG. 3 is a structural view showing a concept of a discharge surface treatment apparatus. Referring to FIG. 3, reference numeral 1 represents a green-compact electrode, 2 represents an object 2 which must be machined, 3 represents a working tank, 4 represents oil-based working fluid of a kerosene type, 5 represents a switching element for switching voltage and an electric current which are exerted to the green-compact electrode 1 and the object 2 which must be machined and 6 represents a control circuit for controlling the switching operation of the switching element 5 Reference numeral 7 represents an electric power source, represents a resistor unit and 9 represents a formed hard coating film.

Then, the discharge surface treatment according to this embodiment will now be described. To mold the green-compact electrode 1 shown in FIG. 1, a mixture of metal powder 11, which is a material of the green-compact electrode and fluid 12 which is the same as the working fluid is injected into a die 22 structured as shown in FIG. 2. The punch 21 is operated to exert a pressure of about some hundreds of MPa so that the electrode is compression-molded into an arbitrary shape. The metal powder 11 and the fluid 12 which is the same as the working fluid are mixed with each other, and then the compression molding is performed. Therefore, an effect can be obtained in that the mold release characteristics can be improved and bonding force of powder can be enlarged.

A case in which the metal powder 11 is made of Ti will now be described. Referring to FIG. 3, pulse-like discharge is caused to occur between the green-compact electrode 1 and the object 2 which must be machined while a proper gap (10 μm to tens of 10 μm) between the green-compact electrode 1, which has been compression-molded, and the object 2 which must be machined is being maintained. Thus, the green-compact electrode 1 is worn owing to the energy of the discharge. Therefore, carbon which is the component in the working fluid 4 and Ti which is the component in the green-compact electrode 1 react with each other, causing hard TiC to be produced. As a result, the hard coating film 9 is formed on the surface of the object which must be machined. The fluid 12, which is the same as the working fluid and which has been mixed into the green-compact electrode 1 when the molding operation has been performed, are dispersed and melted in the working fluid on discharge. Since the fluid 12 has the same components as those of the working fluid 4, change in the components and the component ratio in the working fluid 4 after dispersion and melting can be inhibited. Therefore, the discharge surface treatment which is performed by using the green-compact electrode 1 is free from adverse influence of dispersion and melting of the fluid 12, which is the same as the working fluid and which has been mixed with the green-compact electrode 1, on the formation of the hard coating film on the object which must be machined.

When the mixture ratio of the fluid 12, which is the same as the working fluid, with respect to the green-compact electrode 1 is 5 wt % to 10 wt %, the mold release characteristics and brittleness realized after the green-compact electrode has been molded can considerably be improved. Therefore, breakage of the mold can be prevented. Moreover, no adverse influence is exerted on the formation of the hard coating film on the object which must be machined. The foregoing facts have been confirmed from experiments.

Second Embodiment

Although the first embodiment is structured such that the working fluid 4 is oil-based working fluid of a kerosene type, a polymer compound or its solution may be employed as the working fluid to obtain similar effects.

Third Embodiment

Figure 4:
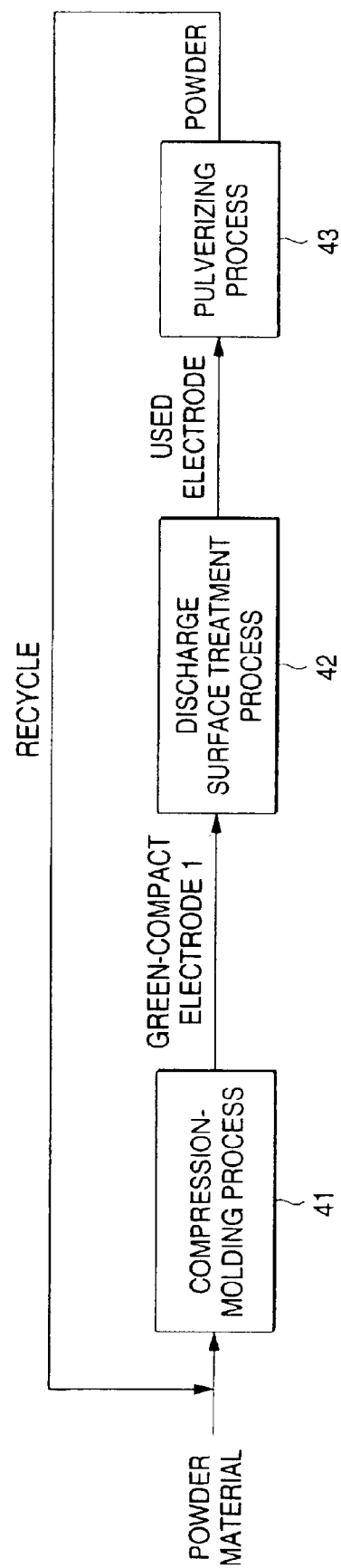
FIG. 4 is a block diagram showing a flow of a recycling process of a green-compact electrode for discharge surface treatment according to the present invention.
Figure 5:
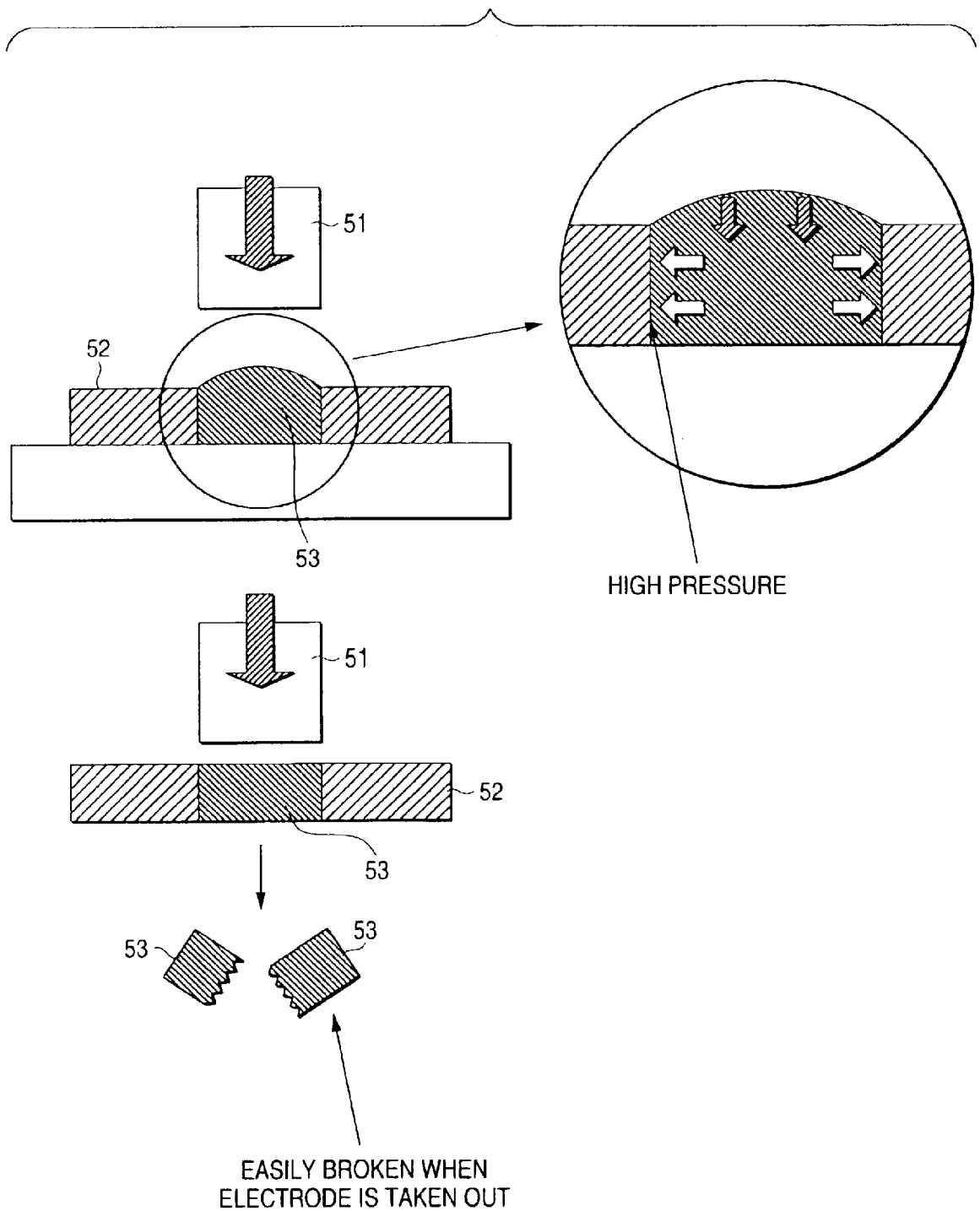
FIG. 5 is a diagram showing a conventional method of compression-molding a green-compact electrode for discharge surface treatment.

When the first and second embodiments are structured such that the green-compact electrode 1 employed to form the hard coating film 9 on the object 2 which must be machined is pulverized into sizes which can be compression-molded, the green-compact electrode can be reproduced by using the pulverized material. FIG. 4 is a block diagram showing a flow of a recycling process of the green-compact electrode 1. Referring to FIG. 4, reference numeral 41 represents a compression-molding step for compression-molding the mixture of the metal powder 11 and the fluid 12, which is the same as the working fluid, to manufacture the green-compact electrode 1. Reference numeral 42 represents a discharge surface treatment step for forming the hard coating film 9 on the object 2 which must be machined by using the green-compact electrode 1. Reference numeral 43 represents a pulverizing step for pulverizing a portion of the green-compact electrode left after the discharge surface treatment step has been completed. The material formed into powder in the pulverizing step 43 is adjusted in such a manner that the mixture ratio of the metal powder 11 and the fluid 12 which is the same as the working fluid is made to be a predetermined value. Then, the compression molding process is performed. Thus, the material can again be used in the discharge surface treatment step 42 as the green-compact electrode 1. The components formed into powder in the pulverizing step 43 were analyzed. As a result, only the components of the metal powder 11 and the working fluid 4 detected before the discharge surface treatment were observed. Therefore, a fact was confirmed that the metal powder 11, which has not been subjected to the discharge surface treatment, does not degenerate owing to the discharge surface treatment. The reason for this lies in that great consumption of the green-compact electrode 1 owing to the energy of the discharge does not permit a portion on which an influence of heat produced by the discharge to be left in the green-compact electrode 1. That is, when the used green-compact electrode 1 is pulverized, the powder of the used green-compact electrode 1 is a mixture of the metal powder 11, which has not been subjected to the discharge surface treatment, and the working fluid 4. Thus, recycling of the green-compact electrode 1 is permitted.

Since the present invention is structured as described above, the following effects can be obtained.

The green-compact electrode for discharge surface treatment disclosed in the first aspect of the present invention is obtained by mixing the fluid which is the same as the working fluid and the material of the green-compact electrode for discharge surface treatment. Therefore, the brittleness of the green-compact electrode for the discharge surface treatment can be improved. Moreover, an effect can be obtained in that the discharge surface treatment using the foregoing green-compact electrode for the discharge surface treatment enables a stable and uniform hard coating film to be formed on the object which must be machined.

The green-compact electrode for discharge surface treatment disclosed in the second aspect of the present invention has the structure that the mixture ratio of the fluid which is the same as the working fluid with respect to the green-compact electrode for discharge surface treatment is 5 wt % to 10 wt %. Therefore, effects similar to those obtainable from the first aspect of the present invention can be obtained.

The method of manufacturing a green-compact electrode for discharge surface treatment disclosed in the third aspect the present invention comprises the step of: compression-molding the mixed material of the material of the green-compact electrode for discharge surface treatment and fluid which is the same as working fluid to manufacture the green-compact electrode for discharge surface treatment. Therefore, the mold release characteristics and hardenability of the green-compact elect-ode for discharge surface treatment required in the compression molding process can be improved. As a result, an effect can be obtained in that the green-compact electrode for discharge surface treatment can efficiently be manufactured.

The method of manufacturing a green-compact electrode for discharge surface treatment disclosed in the fourth aspect of the present invention comprises the step of: compression-molding the mixed material having the structure that the mixture ratio of the fluid which is the same as the working fluid with respect to the green-compact electrode for discharge surface treatment is 5 wt % to 10 wt % to manufacture the green-compact electrode for discharge surface treatment. Therefore, effects similar to those obtainable from the third aspect can be obtained.

The method of performing discharge surface treatment disclosed in the fifth aspect of the present invention comprises the step of: using the mixed material of the material of the green-compact electrode for discharge surface treatment and fluid which is the same as the working fluid as an electrode. Therefore, repetition of the discharge surface treatment does not exert an influence on the formation of the hard coating film on the object which must be machined. Hence it follows that an effect can be obtained in that uniform hard coating film can be formed and the film forming performance of the material of the electrode can be obtained.

The apparatus for performing discharge surface treatment disclosed in the sixth aspect of the present invention comprises: the material of the green-compact electrode for discharge surface treatment and the fluid which is the same as the working fluid which constitute the green-compact electrode for discharge surface treatment. Therefore, a discharge surface treatment apparatus can be obtained where repetition of the discharge surface treatment does not exert an influence on the formation of the hard coating film on the object which must be machined. Hence it follows that uniform hard coating film can be formed and the film forming performance of the material of the electrode can be obtained.

The method of recycling a green-compact electrode for discharge surface treatment disclosed in the seventh aspect of the present invention comprises: the compression molding step for molding the mixed material of the material of the green-compact electrode for discharge surface treatment and the fluid which is the same as the working fluid; the discharge surface treatment step for performing the discharge surface treatment process by using the electrode obtained by compression molding; and the pulverizing step for forming portions in which the electrodes are left after the discharge surface treatment step has been completed into powder, wherein the compression molding step and following steps can be repeated after the pulverizing step has been completed Therefore, an effect can be obtained in that recycling of the green-compact electrode for the discharge surface treatment is permitted Industrial Applicability As described above, the green-compact electrode for discharge surface treatment according to the present invention is suitable for the discharge surface treatment operation in that a hard coating film is formed on the surface of an object which must be machined by performing a discharge process in working fluid. Also, a method of manufacturing the green-compact electrode for discharge surface treatment according to the present invention is suitable for manufacturing an electrode for the aforementioned discharge surface treatment Further, a method and an apparatus for performing the discharge surface treatment according the present invention are suitable for the aforementioned discharge surface treatment operation. Furthermore, a method of recycling the green-compact electrode for discharge surface treatment according to the present invention is suitable for the aforementioned discharge surface treatment operation.

What is claimed is:

1. A green-compact electrode for electrical discharge surface treatment of a work comprising: a compression molded mixture of a metal powder and a working liquid having a carbon component.

2. A green-compact electrode for electrical discharge surface treatment according to claim 1, wherein the working liquid constitutes 5 wt % to 10 wt % of the green compact electrode.

3. A method of manufacturing a green-compact electrode for electrical discharge surface treatment comprising: the step of compression-molding a mixed material of a metal powder and a working liquid having a carbon component.

4. A method of manufacturing a green-compact electrode for electrical discharge surface treatment according to claim 3, wherein a mixture ratio of the working liquid constitutes 5 wt % to 10 wt % of the green compact electrode.

5. A method of performing electrical discharge surface treatment comprising:

positioning a green-compact electrode comprised of a compression molded material of a metal powder and a working liquid having a carbon component opposite a work in a second working liquid, which is the same as the working liquid within the green-compact electrode; and forming a hard coating film on the work by causing electrical discharge between the green compact electrode and the work.

6. An apparatus for performing electrical discharge surface treatment comprising: a green-compact electrode comprised of a compression molded mixture of metal powder and a working liquid having a carbon component; a work; a working tank for receiving said work; and means for causing an electrical discharge between said green compact electrode and said work.

7. A method of recycling a green-compact electrode for electrical discharge surface treatment comprising:

a) compression molding a mixed material of a metal powder and a working liquid having a carbon component to form the green-compact electrode;

b) positioning the green-compact electrode opposite a work;

c) performing discharge surface treatment by causing electrical discharge between the green-compact electrode and the work to form a hard coating on the work;

d) pulverizing portions of the green-compact electrode which are left after said discharge surface treating has been completed into powder, and e) compression molding the powder obtained from the pulverizing step to obtain a new green-compact electrode.

8. A method of recycling electrodes used in electrical discharge surface treatment, comprising:

collecting used electrodes which are primarily composed of compressed powders;

pulverizing said used electrodes into a powder; and compression molding said powder to form new electrodes, wherein the compressed powders comprise metal powder and working fluid.

9. The method of recycling electrodes according to claim 8, comprising adjusting the mixture ratio of the metal powder and the working fluid.

* * * * *